April 26, 1960
S. ALESKIN
2,934,298
FISHING ROD HOLDER
Filed March 31, 1955
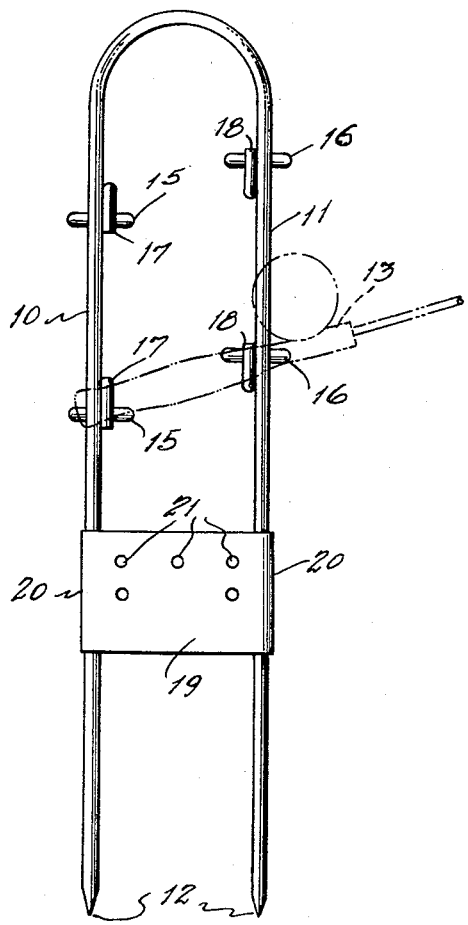
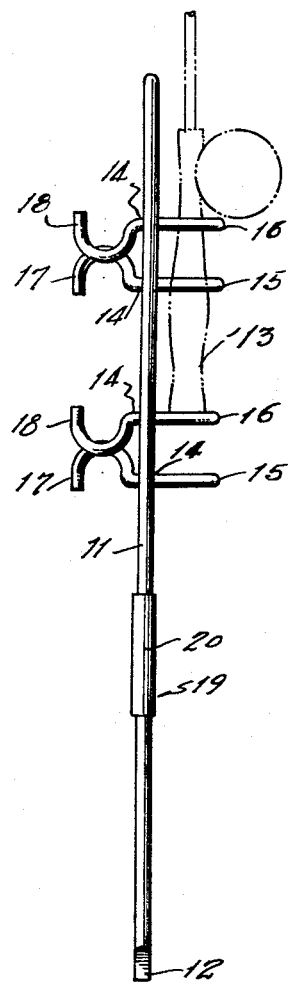
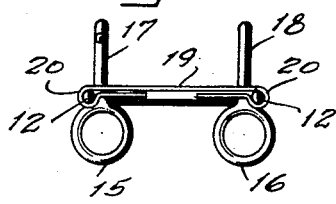
Samuel Aleskin
INVENTOR.
BY
ATTORNEY

United States Patent Office 2,934,298
Patented Apr. 26, 1960

2,934,298

FISHING ROD HOLDER

Samuel Aleskin, Amarillo, Tex.

Application March 31, 1955, Serial No. 498,300

2 Claims. (Cl. 248—39)

This invention relates to equipment for fishermen for rod or pole fishing, and it has particular reference to devices for holding rods or poles along shore lines or banks of streams, or in connection with boat fishing, to secure the rod or pole in stationary angular or vertical positions, and the principal object of the invention resides in the provision of a simple and economical device which can be employed in either land or boat fishing where the fisherman desires to utilize a plurality of rods or poles without manual operation in order to put into operation a number of lines at one time.

An object of the invention is that of providing a standard formed in such a manner as to be capable of ready insertion into the ground near a stream, or body of water, or apply to the gunwale of a boat, by which the rods or poles can be set and properly secured in operative positions unattended although safe from being dislodged.

Another object of the invention resides in the provision of a holder device for fishing rods or poles in which the retaining members are properly offset on the legs of the device to insure the proper operative inclination of the fishing rods and poles and retain the same against loss or damage through displacement when unattended, both in bank or shore fishing and when the device is used from a boat.

Broadly, the invention contemplates the provision of a simple and economical holder device for fishermen in setting and holding the rods or poles in ready use without constant attention and with the assurance that the equipment is safely but operatively secured.

While the foregoing objects are paramount, other and lesser objects will become manifest as the description proceeds, taken in connection with the appended drawings wherein:

Figure 1 is a rear elevational view of the invention showing a boat rail clamp attached thereto, and illustrating, in broken lines, a fishing rod supported thereon.

Figure 2 is a side elevational view of the invention illustrating the opposingly arranged hooks and offset loops, showing, in broken lines, a fishing rod supported in the loops, and Figure 3 is an inverted plan view of the invention illustrating the loops and hooks, and showing the detachable boat clamp on the legs.

Accordingly, the invention comprises a substantially U-shaped structure, preferably formed of round or square stock rod, which defines a pair of parallel legs 10 and 11 whose free ends 12 are flattened or sharpened to facilitate their being thrust into the earth, thus providing a standard for supporting a fishing rod 13 or a common pole, as desired.

The legs 10 and 11 may be spaced as desired and have members 14 rigidly secured thereto, as by welding, or other device, which are formed on one end to define loops 15 and 16 and hooks 17 and 18 at their opposite ends, the loops 15 and 16 being on one side of the leg while the hooks 17 and 18 are on the opposite side thereof, as shown in Figures 2 and 3. The members 14 are offset on the leg 10 with respect to the identical members on the opposite leg 11, as shown in Figures 1 and 2, and the hooks 17 and 18 are opposingly arranged so that the hooks 17 are directed downwardly and the hooks 18 are open upwardly, as indicated in Figures 1 and 2, the former being located below the hooks 18 which support the rod 13 while the hooks 17 merely retain the same against leverage on the hooks 18.

The loops 15 and 16 formed opposite the hooks 17 and 18 on the members 14 are in axial alignment longitudinally of the legs 10 and 11, as shown in Figure 3, but these are also offset on one leg with respect to the other and are capable of supporting the rod 13 in vertical positions, as indicated in Figure 2, on either leg 10 or 11.

Provision is made for detachable securement of the invention to the gunwale of a boat (not shown) through a clamp 19 of a relative thin sheet metal formed with a pair of parallel tubular channels 20 at each side to slidably receive the legs 10 and 11 of the standard, as shown in Figures 1 and 3, in the same manner as when these members are inserted into the earth. A plurality of apertures 21 are provided in the clamp 19 by which the device can be secured by screws, or other device to the boat. This arrangement is shown in Figure 1.

Manifestly, the structure herein shown and described is capable of certain changes and modifications, from time to time, by persons skilled in the art, without departing from the spirit of the invention or the scope of the appended claims.

What is claimed is:

1. A fishing rod holder comprising a vertical standard consisting of a U shaped rod, sharpened at its ends for engagement with the ground, and two pairs of hooks, the hooks of each pair having their shank portions rigidly connected, respectively, to upper portions of the legs of the rod, the hooks of one pair being positioned at a higher elevation than the hooks of the other pair, the shank portions of the hooks being disposed horizontally, in parallel relation to each other and at right angles to the plane of the standard, one of the hooks of each pair extending laterally from one side of the standard and having a downwardly facing opening, the other hook of each pair extending laterally from the same side of the standard and having an upwardly facing opening, the last mentioned hook being positioned at a higher elevation than the first mentioned hook, a horizontally disposed loop being formed on the shank portion of each of the hooks, the loops extending laterally from the side of the standard opposite the hooks and one of the loops of each pair being aligned vertically with a corresponding loop of the other pair.

2. In a fishing rod holder as described in claim 1, a sheet metal plate embracing the legs of the rod and having apertures therein for the insertion of screws, for use in attaching the holder to the gunwale of a boat.

References Cited in the file of this patent

UNITED STATES PATENTS

| 649,367 | Seiler | May 8, 1900 |
|---|---|---|
| 2,271,616 | Beale | Feb. 3, 1942 |
| 2,526,067 | Curtess | Oct. 17, 1950 |
| 2,592,306 | Maze | Apr. 8, 1952 |
| 2,593,783 | Mitchel | Apr. 22, 1952 |
| 2,593,789 | Pearson | Apr. 22, 1952 |
| 2,645,440 | Heistand | July 14, 1953 |
| 2,698,726 | Howe | Jan. 4, 1955 |

OTHER REFERENCES

King-Fish Rod Holder, circular received June 15, 1955, published prior to February 16, 1953.